(12) United States Patent
Nakamura et al.

(10) Patent No.: US 7,954,835 B2
(45) Date of Patent: Jun. 7, 2011

(54) FRONT WHEEL SUSPENSION STRUCTURE FOR SADDLE-TYPE VEHICLE, AND VEHICLE INCORPORATING SAME

(75) Inventors: Koshi Nakamura, Saitama (JP); Akio Handa, Saitama (JP); Seiji Hanafusa, Saitama (JP); Akihiro Yamashita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 117 days.

(21) Appl. No.: 12/380,231

(22) Filed: Feb. 25, 2009

(65) Prior Publication Data
US 2009/0243248 A1 Oct. 1, 2009

(30) Foreign Application Priority Data

Mar. 31, 2008 (JP) ................... 2008-092718
Mar. 31, 2008 (JP) ................... 2008-093073
Mar. 31, 2008 (JP) ................... 2008-093076

(51) Int. Cl.
*B60G 3/18* (2006.01)
(52) U.S. Cl. ............................................. 280/124.135
(58) Field of Classification Search ........... 280/124.135, 280/124.134, 124.138, 124.139, 124.136
See application file for complete search history.

(56) References Cited

U.S. PATENT DOCUMENTS

| 6,412,797 | B1 | 7/2002 | Park | |
|---|---|---|---|---|
| 6,695,329 | B2 | 2/2004 | Handa | |
| 7,398,982 | B2 | 7/2008 | Hozumi | |
| 7,441,788 | B2 * | 10/2008 | Leclair | 280/93.512 |
| 2003/0000764 | A1 * | 1/2003 | Seiki | 180/376 |
| 2006/0006623 | A1 * | 1/2006 | Leclair | 280/93.512 |
| 2007/0228683 | A1 * | 10/2007 | Ciasulli | 280/124.1 |
| 2009/0057509 | A1 * | 3/2009 | Hirukawa | 248/205.1 |

FOREIGN PATENT DOCUMENTS

| CN | 1680161 | 10/2005 |
|---|---|---|
| JP | 2001-328410 | 11/2001 |
| JP | 3792851 B2 | 4/2006 |
| JP | 2006-273140 | 10/2006 |

* cited by examiner

*Primary Examiner* — Faye M. Fleming
(74) *Attorney, Agent, or Firm* — Carrier Blackman & Associates, P.C.; William D. Blackman; Joseph P. Carrier

(57) ABSTRACT

A front wheel suspension structure for a saddle-type vehicle (all terrain vehicle) includes a double wishbone suspension system. The double wishbone suspension system includes a pair of right and left upper arms and a pair of right and left lower arms. The upper arm and the lower arm each include a front arm portion and a rear arm portion, respectively, and each of the upper arm and the lower arm is attached to a side of a body frame at two points. When viewed in a side view, the rear arm portion of the upper arm is located in front of the rear arm portion of the lower arm. A front shock absorber is arranged behind the rear arm portion of the upper arm.

18 Claims, 10 Drawing Sheets

FRONT WHEEL SUSPENSION STRUCTURE FOR SADDLE-TYPE VEHICLE, AND VEHICLE INCORPORATING SAME

CROSS-REFERENCE TO RELATED APPLICATIONS

The present invention claims priority under 35 USC 119 based on Japanese patent application Nos. 2008-093073, 2008-093076 and 2008-092718, each filed on Mar. 31, 2008. The entire subject matter of these priority documents, including specification, claims and drawings, is incorporated by reference herein.

BACKGROUND OF THE INVENTION

1. Field of the Invention

The present invention relates to front wheel suspension structure of a saddle-type vehicle (e.g., all terrain vehicle), and a vehicle incorporating same. More particularly, the present invention relates to a front wheel suspension structure of a saddle-type vehicle, where a double wishbone suspension system is mounted on a vehicle body of the saddle-type vehicle.

2. Description of the Background Art

There is a known saddle-type vehicle (an ATV type vehicle) operable to run in an off-road environment or on an uneven road. The saddle-type vehicle includes a double wishbone suspension system for suspension structure on a front side thereof. In the suspension structure of the saddle-type vehicle, in which the double wishbone suspension system is mounted on the vehicle body, a lower arm is arranged in front of an upper arm.

An example of such known saddle-type vehicle is disclosed in the Japanese Patent Document JP-A No. 2006-273140.

A front shock absorber configuring a portion of a front suspension is a relatively heavy member in the front suspension. An upper end of the front shock absorber is attached to a body frame and a lower end is attached to the lower arm through a substantially triangular-shaped portion, when viewed in a top view, formed by the upper arm and a front side of a tie rod. The lower arm is molded by casting, and is a relatively heavy member like the front shock absorber.

In a saddle-type vehicle where the vehicle is configured and arranged so that weight of a body is concentrated in the proximity of the center of the body, its posture in the air when the vehicle jumps is easily controlled. However, when the front suspension components such as the shock absorber and the lower arm (which are respectively relatively heavy) are arranged on the front side of the body, the weight of the body is distributed in a more spread-out arrangement and consequently, its airborne posture during a jump is less easily controlled, and such a situation is not desirable.

The present invention has been made to overcome such drawbacks of existing front wheel suspension structure for a saddle-type vehicle. Accordingly, it is one of the objects the present invention to provide a front wheel suspension structure of a saddle-type vehicle where mass can be concentrated in a position close to the center of a body of the vehicle.

SUMMARY OF THE INVENTION

In order to achieve the above objects, the present invention according to a first aspect thereof provides a front wheel suspension structure of a saddle-type vehicle. The front wheel suspension structure includes a double wishbone suspension system configured by a pair of right and left upper arms, and a pair of right and left lower arms.

The present invention according to the first aspect thereof is characterized in that the upper arm and the lower arm are respectively configured by a front arm portion and a rear arm portion, that each of the upper arm and the lower arm is attached to a side of the body at two points, that the rear arm portion of the upper arm is located in front of the rear arm portion of the lower arm in the body, when viewed, when viewed in a side view, and a front shock absorber is arranged on a rear side in the body of the rear arm portion of the upper arm.

The present invention according to a second aspect thereof, in addition to the first aspect, is characterized in that the front shock absorber is also arranged on the rear side in the body of a tie rod.

The present invention according to a third aspect thereof, in addition to one of the first and second aspects, is characterized in that the front arm portion of each of the pair of right and left upper arms is extended in a lateral direction, that the rear arm portion is extended diagonally forward direction, and that the front shock absorber is extended in a position overlapped with an upper arm supporting member, when viewed in a side view, and the rear arm portion is attached to the lower arm between front and rear arm portion supporting portions of the lower arm.

According to these configurations of the first through third aspects of the present invention, a center of gravity of the front shock absorber can be shifted in a central direction of the body.

The present invention according a fourth aspect thereof provides a front wheel suspension structure of a saddle-type vehicle, having a double wishbone suspension system configured by a pair of right and left upper arms and a pair of right and left lower arms, and is characterized in that the lower arm is arranged in a central direction of a body of the upper arm.

According to this configuration, a center of gravity of the lower arm can be shifted in the central direction of the body.

The present invention according a fifth aspect thereof, in addition to the fourth aspect, is characterized in that the upper arm and the lower arm are respectively configured by a front arm portion and a rear arm portion, each of the upper arm and the lower arm is attached to a side of the body at two points, the rear arm portion of the upper arm is located in front of the rear arm portion of the lower arm in the body, when viewed in a side view, and that a front shock absorber is provided on a rear end side of the rear arm portion of the upper arm.

According to this configuration, a center of gravity of the front shock absorber can be shifted in the central direction of the body.

Further, a front supporting portion of the lower arm may also be provided on an extended line of a steering shaft.

According to this configuration, the center of gravity of the lower arm can be shifted in the central direction of the body.

Furthermore, a front frame is configured by an upper front frame that supports an upper end of the front shock absorber and a lower front frame that supports the front arm portion and the rear arm portion, the upper front frame and the lower front frame are welded on a front side, and a pair of right and left frame members extending vertically may be also provided between the upper and lower front frame sections.

According to this configuration, the strength of the front frame can be enhanced.

EFFECT OF THE INVENTION

According to the front wheel suspension structure of the saddle-type vehicle according to the first aspect of the present invention, as the upper arm and the lower arm are respectively configured by the front arm portion and the rear arm portion, each of the upper and lower arms is attached to the side of the body at the two points, the rear arm portion of the upper arm is located in front of the rear arm portion of the lower arm in the body, when viewed in a side view, and the front shock absorber is arranged on the rear side in the body of the rear arm portion of the upper arm, the center of gravity of the heavy front shock absorber can be shifted in the central direction of the body and the mass of the whole vehicle can be concentrated on the central side of the body.

Accordingly, appropriate desirable layout of the vehicle body of saddle-type vehicle is facilitated for operating the vehicle on uneven surfaces. As the lower end of the front shock absorber can be attached to the lower arm from the rear side of the upper arm, work for mounting the shock absorber can be facilitated.

In addition, as the front shock absorber is arranged on the rear side in the body of the tie rod, the mass of the whole vehicle can be similarly concentrated on the central side of the body. Accordingly, the desirable layout of the body is achieved for operation of the saddle-type vehicle even when the vehicle is lifted in air when operated on an uneven, undulated ground surface.

Further, as the front arm portion of each of the pair of right and left upper arms is extended in the lateral direction, the rear arm portion is extended diagonally forward, the front shock absorber is extended in the position overlapped with the upper arm supporting member in the side view and is attached to the lower arm between the front and rear arm portion supporting portions of the lower arm, space for arranging the front shock absorber can be secured by extending the rear arm portion of the upper arm diagonally forward, the rear arm portion of the lower arm is arranged on the rear side to enable supporting the lower end of the front shock absorber between the front arm portion and the rear arm portion of the lower arm, and the mass of the whole vehicle can be concentrated on the central side of the body.

In the front wheel suspension structure of the saddle-type vehicle according to the invention, as the lower arm is arranged in the central direction of the body off the upper arm, the center of gravity of the heavy lower arm can be shifted in the central direction of the body and the mass of the whole vehicle can be concentrated on the central side of the body. Accordingly, the desirable layout of the body is achieved for operation of the saddle-type vehicle even when the vehicle is lifted in air when operated on an uneven, undulated ground surface.

As the upper arm and the lower arm are respectively configured by the front arm portion and the rear arm portion, each of the upper arm and the lower arm is attached to the side of the body at two points, the rear arm portion of the upper arm is located in front of the rear arm portion of the lower arm in the body in the side view and the front shock absorber is provided on the rear side of the rear arm portion of the upper arm, the center of gravity of the front shock absorber can be shifted in the central direction of the body and the mass of the whole vehicle can be concentrated on the central side of the body. Accordingly, the desirable layout of the body is achieved for operation of the saddle-type vehicle even when the vehicle is lifted in air when operated on an uneven, undulated ground surface.

Besides, as the lower end of the front shock absorber can be attached to the lower arm offset from the rear side of the upper arm, work for mounting can be facilitated.

Further, as the front supporting portion of the lower arm is provided on the extended line of the steering shaft, the center of gravity of the heavy lower arm can be shifted in the central direction of the body and the mass of the whole vehicle can be concentrated on the central side of the body. Accordingly, the desirable layout of the body is achieved for operation of the saddle-type vehicle even when the vehicle is lifted in air when operated on an uneven, undulated ground surface.

Furthermore, as the front frame is configured by the upper front frame that supports the upper end of the front shock absorber and the lower front frame that supports the front arm portion and the rear arm portion, the upper front frame and the lower front frame are welded on the front side and the pair of right and left frame members vertically extended is provided between the upper and lower front frame sections, the strength of the front frame that functions as a base for mounting a front suspension can be enhanced.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
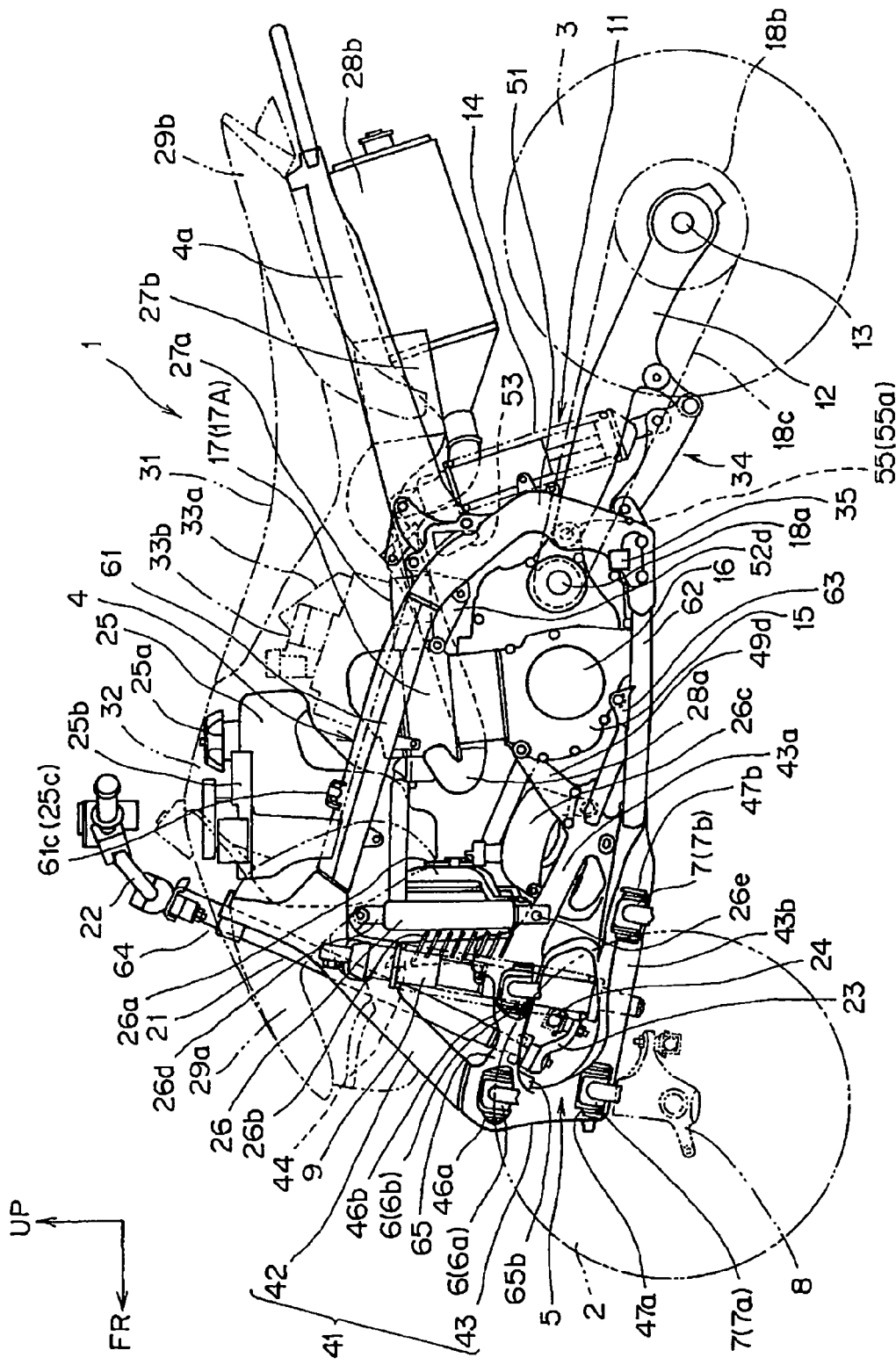
FIG. 1 is a left side view showing a saddle-type vehicle in one embodiment of the present invention.

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

In other words, a direction such as forward, backward, rightward and leftward in the following description shall be the same as a direction in a vehicle unless the direction is particularly described. An arrow FR in the drawings points to a forward (operating) direction of the vehicle, an arrow LH points to a leftward direction of the vehicle, and an arrow UP points to the upward direction of the vehicle.

Referring to the attached drawings, an illustrative embodiment of the present invention is described below.

FIG. 1 shows a saddle-type vehicle 1. The saddle-type vehicle 1, which is also known as an all terrain vehicle (ATV), is provided with a pair of right and left front wheels 2, and a pair of right and left rear wheels 3 respectively, including low pressure balloon tires having a relatively large diameter in the front, and in the rear of a compact and light body, in which its minimum road clearance is greatly secured and in which running through performance primarily on an uneven road is enhanced.

The saddle-type vehicle 1 includes a body frame 4. The body frame 4 is a frame made of all aluminum material formed by integrating plural types of aluminum alloy members by welding and other appropriate methods. The body frame 4 has a box structure located at a position close to the front in the center in a lateral direction of the body. The box structure is relatively longer in a longitudinal direction. A front end of a seat frame 4a extended in the longitudinal direction is integrated with a rear end of an upper portion of the body frame 4 by fastening both by a bolt and a portion of a saddle-type seat 31. The saddle-type seat 31 is supported on the seat frame 4a.

A double wishbone (independent suspension type) front suspension 5 is supported by a front portion of the body frame 4. The right and left front wheels 2 are suspended from the front portion of the body frame 4 via the front suspension 5.

The front suspension 5 includes a pair of right and left upper arms 6 attached to both right and left sides on the front side of a lower portion of the body frame 4 so as to be reciprocally vertically movable thereon, and a pair of right and left lower arms 7 attached to both right and left sides of the body frame 4 so as to be reciprocally vertically movable thereon, at a position below (on the downsides of) the pair of right and left upper arms 6. The front suspension 5 also includes a pair of right and left knuckles 8 each of which is supported by ends of the upper arm 6 and the lower arm 7; and a pair of right and left front shock absorbers 9 each of which is inserted between the lower arm 7 and the body frame 4. The right and left front wheels 2 are rotatably supported by the pair of right and left knuckles 8.

A swing arm type (a rigid-axle type) rear suspension (a rigid axle suspension system) 11 is supported by a rear portion of the body frame 4. The right and left rear wheels 3 are suspended from the rear portion of the body via the rear suspension 11.

The rear suspension 11 is provided with a swing arm 12 attached to a center frame 52 so as to be reciprocally vertically movable thereon, via a pivot 55a supported by a pivot portion (a swing arm pivot portion) 55 of the center frame 52. The rear suspension 11 also includes a rear wheel axle 13 supported by a rear end of the swing arm 12 and a single rear shock absorber 14 inserted between the swing arm 12 and the body frame 4, and the right and left rear wheels 3 are rotatably supported on both sides of the rear wheel axle 13.

An engine 15 as a power unit (prime mover) of the saddle-type vehicle 1 is mounted inside the rear of the body frame 4. The engine 15 is a water-cooled, single-cylinder engine provided with a crankshaft in a direction of vehicle width (in lateral direction) and a cylinder 17A disposed in a substantially vertical direction in a crankcase 16 (configuring as lower portion of the engine).

An exhaust pipe 28a of an engine exhaust system is connected to the front side of a cylinder head 17 on the upside portion of the cylinder 17A. The exhaust pipe 28a is extended forward and is bent, is extended in a backward direction of the body through the right side of the cylinder 17A, and is coupled to a silencer 28b on the downside of the seat frame 4a. A throttle body 27a and an air cleaner case 27b respectively disposed in an engine intake system are connected to the side of a rear end of the cylinder head 17.

A drive sprocket 18a is arranged on the left side of the rear of the crankcase 16, a looped drive chain 18c is wound on the drive sprocket 18a and a driven sprocket 18b arranged on an intermediate portion of the rear wheel axle 13. The power of the engine 15 is transmitted to the right and left rear wheels 3 via a chain transmission mechanism, which includes the drive sprocket 18a, the driven sprocket 18b and the looped drive chain 18c.

A steering shaft 21 inclined so that an upper portion thereof is located on the rear side thereof is pivotally supported by the center in the lateral direction of the front of the body frame 4. A steering handlebar 22 is integrated with an upper end of the steering shaft 21 and a center arm (a steering arm on the center side) 23 of a steering mechanism (steering control mechanism) is integrated with a lower end of the steering shaft 21.

Each ball end 24a on the side of each base of a pair of right and left tie rods 24 is coupled to the center arm 23, and a ball end 24b on the side of an end of each tie rod 24 is coupled to each of right and left knuckles 8. Therefore, when the steering shaft 21 is turned by the operation of the steering handlebar 22, this torque is transmitted to the right and left front wheels 2 via the center arm 23 and the tie rod 24 and directions of the front wheels 2 (that is, a traveling direction of the vehicle) are varied.

A fuel tank 25 is arranged in an intermediate portion in a longitudinal direction of the body frame 4, a radiator 26 is arranged on the downside in front of the fuel tank 25, a radiator fan 26a is arranged on a rear face of the radiator 26, and a radiator grille 26b is arranged in front of the radiator 26. A radiator reservoir tank 26c is arranged on the downside rear of the radiator 26.

As shown in FIG. 1, the saddle-type vehicle 1 includes a front fender 29a and a rear fender 29b that respectively cover the periphery of each upper portion of the front wheels 2 and the rear wheels 3, a body cover 32 that mainly covers the front side of an upper portion of the body, a battery 33a and various electrical equipment 33b respectively located between the saddle-type seat 31 and the steering shaft 21 and respectively housed inside the body cover 32, a link mechanism 34 for coupling a lower end of the rear shock absorber 14 to the swing arm 12 and the body frame 4, and right and left steps 35 for an occupant.

Figure 2:
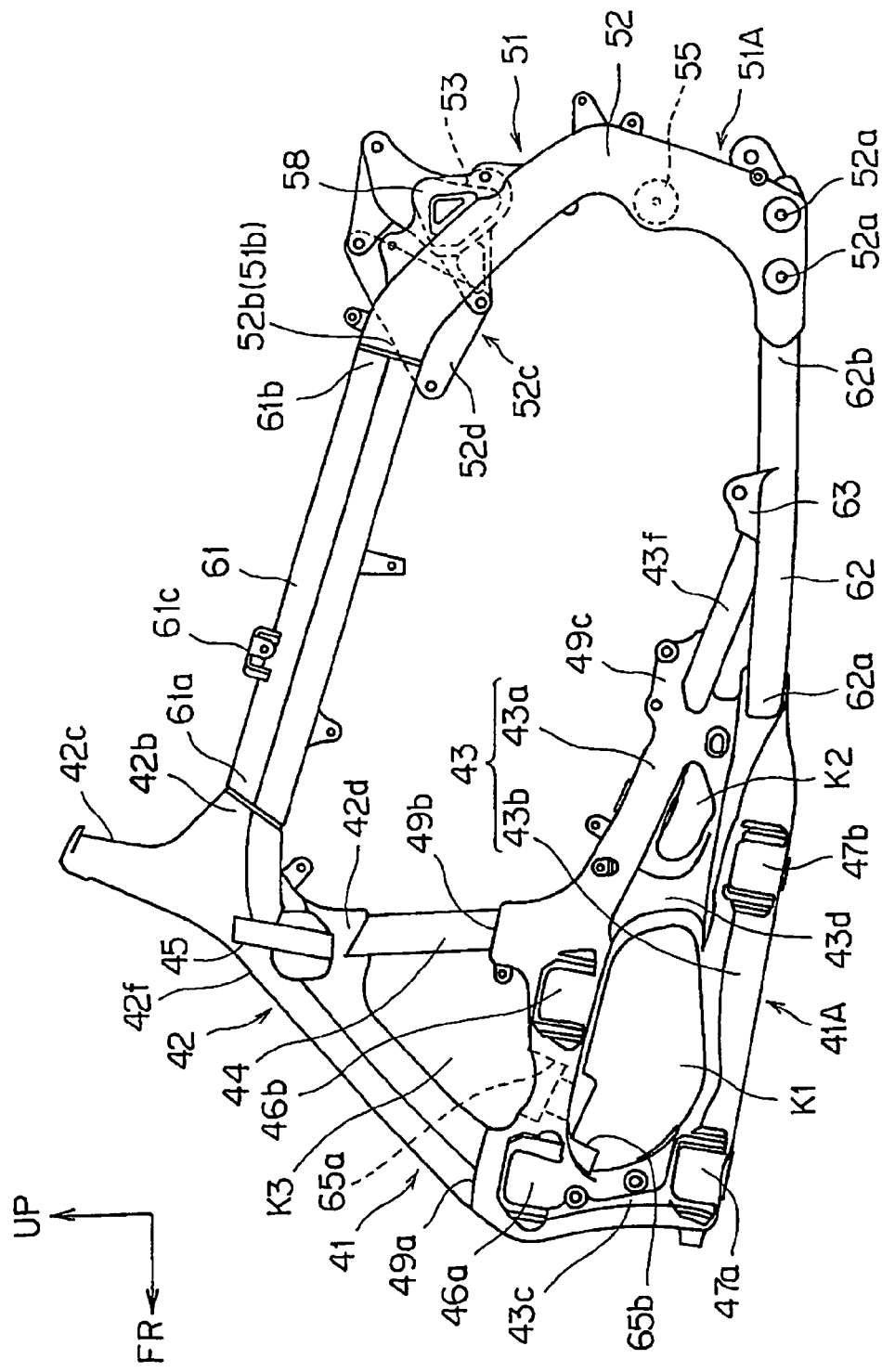
FIG. 2 is a left side view showing a body frame of the saddle-type vehicle.
Figure 3:
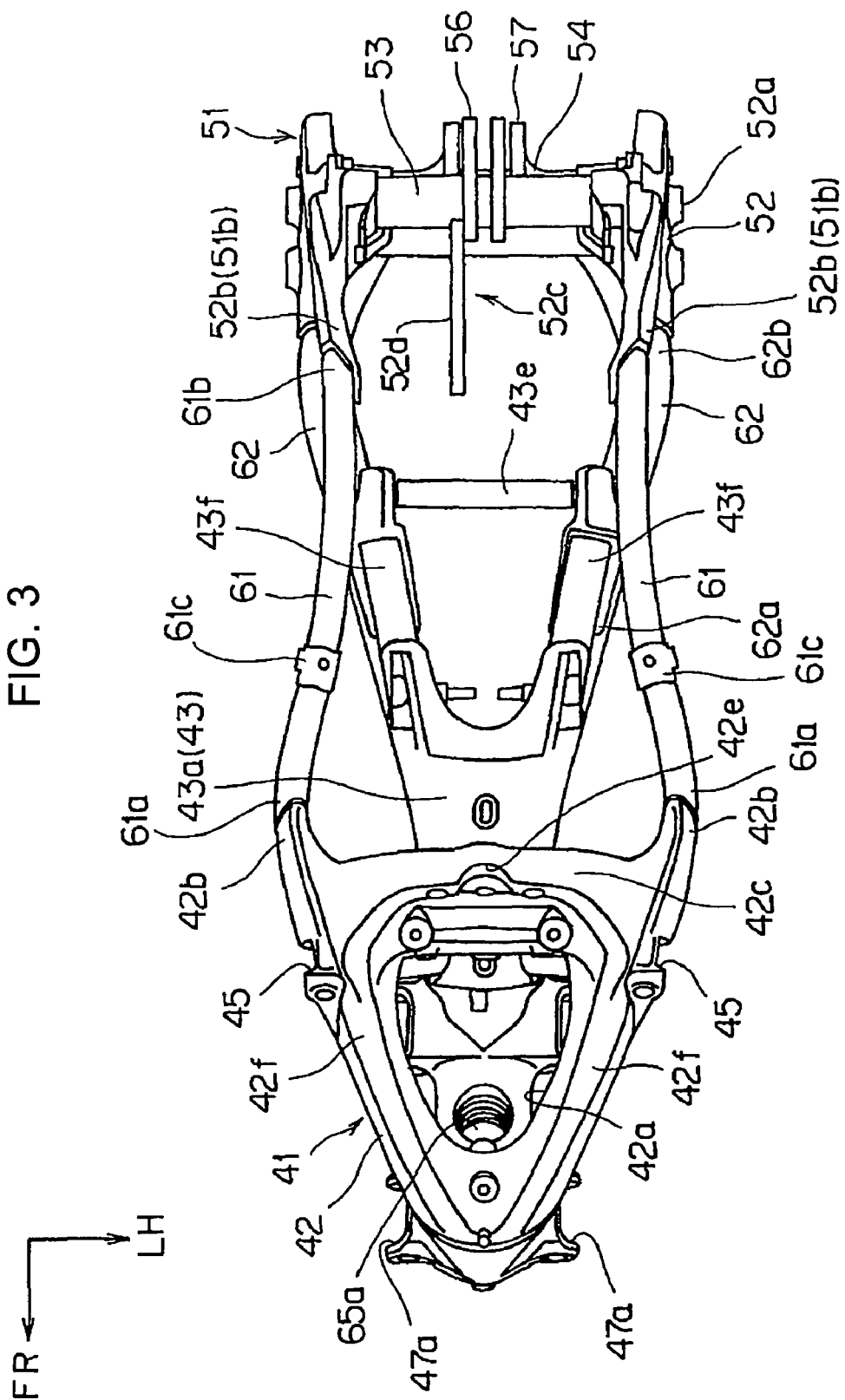
FIG. 3 is a plan view of the body frame shown in FIG. 2.
Figure 4:
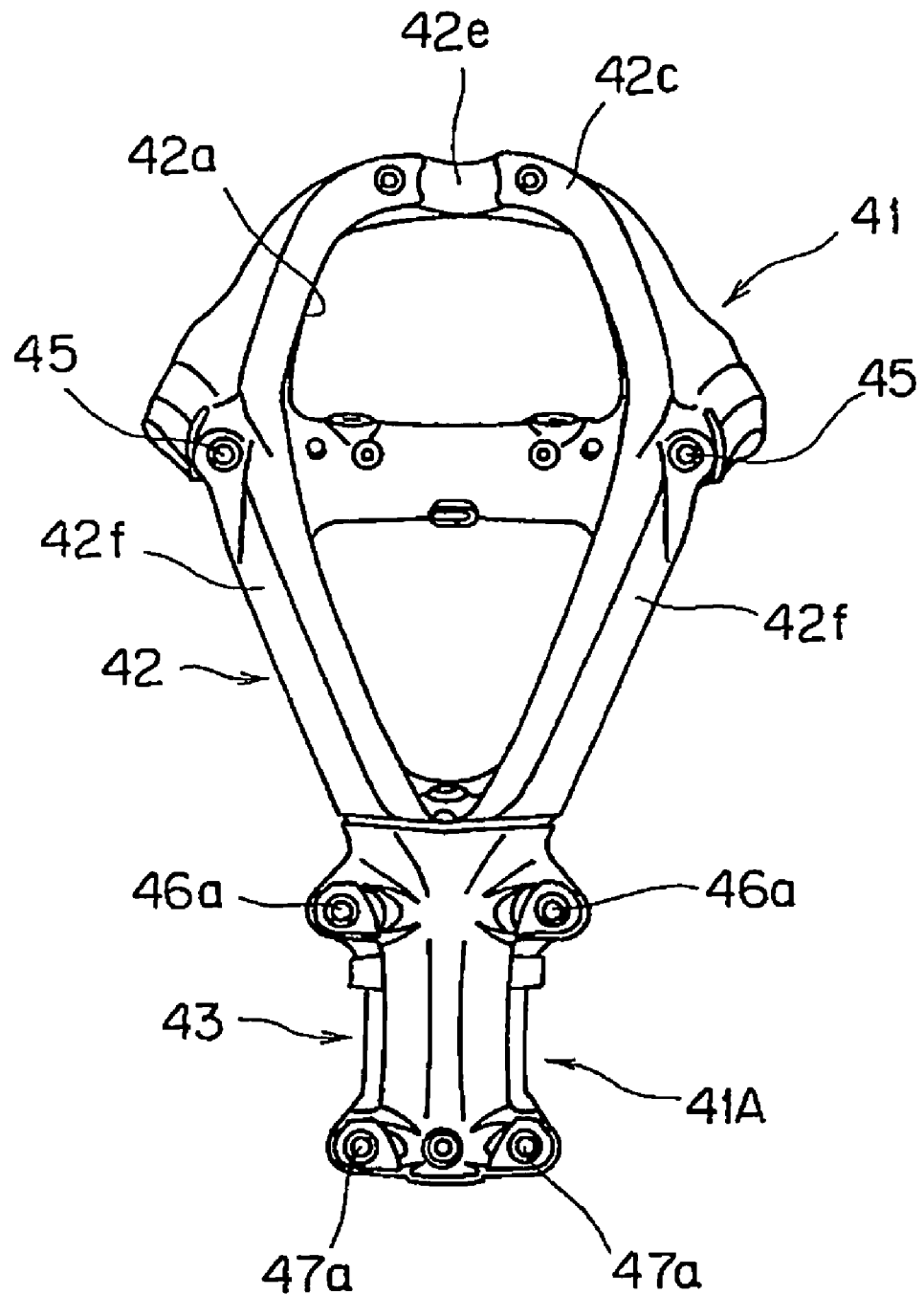
FIG. 4 is a front view of the body frame shown in FIG. 2.
Figure 5:
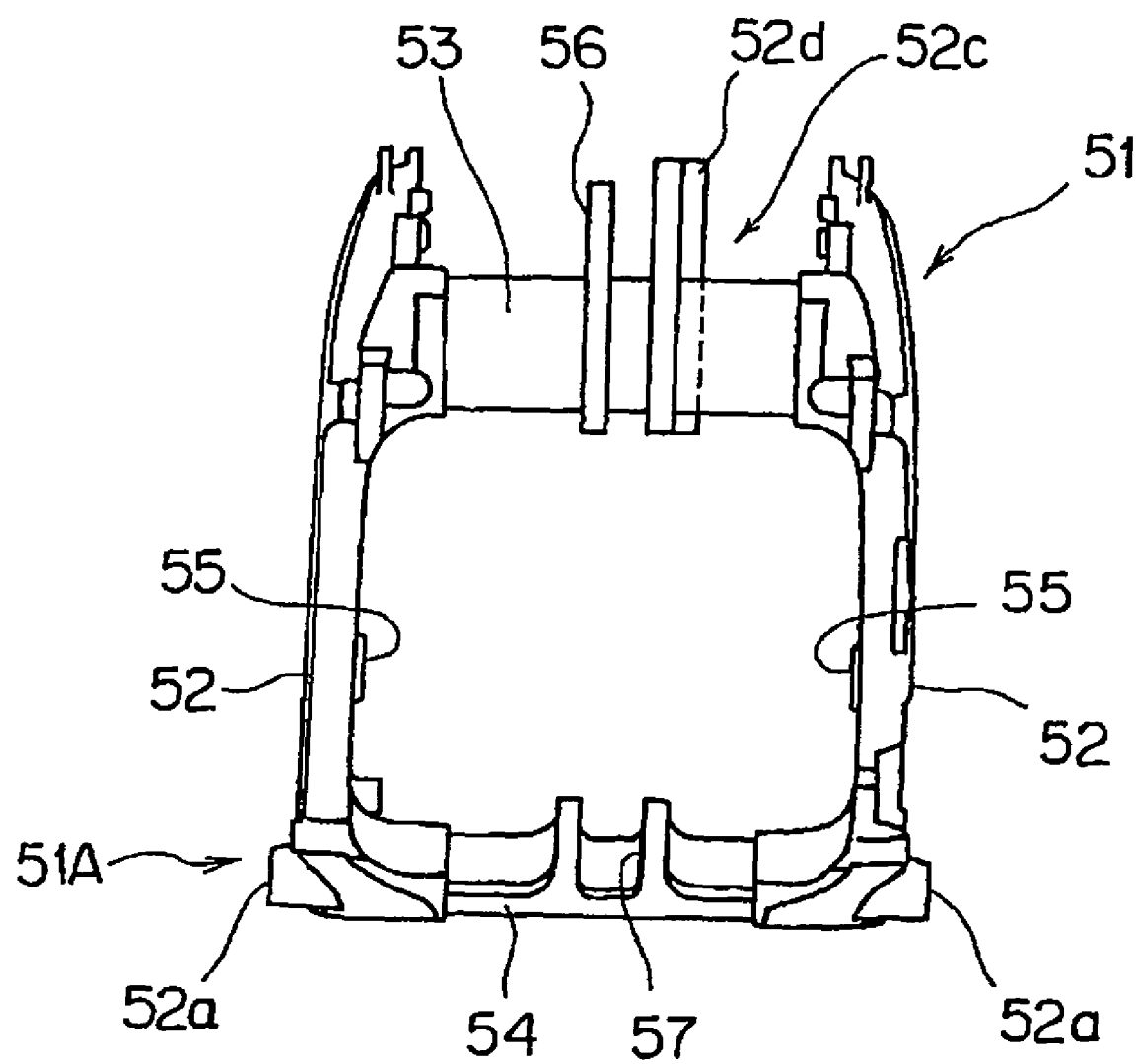
FIG. 5 is a rear view of the body frame shown in FIG. 2

Next, referring to FIG. 2 mainly, and additionally with reference to FIGS. 3 to 5, the structure of the body frame 4 is described.

As shown in FIG. 2, the body frame 4 is formed by integrating a number of aluminum alloy members together by welding and other methods. The body frame 4 includes a front frame assembly 41 having a front suspension supporting member 41A, a center frame assembly 51 having a rear suspension supporting portion 51A, a pair of right and left upper main frame sections 61 and a pair of right and left lower main frame sections 62 respectively for coupling the front frame assembly 41 and the center frame assembly 51.

The front frame assembly 41 is provided with an upper front frame section 42 made wider in the rearward direction of the body, when viewed in a top view, and a lower front frame section 43 (see FIGS. 2 and 3) coupled to a lower portion of the upper front frame section 42 and extended in the rearward direction of the body with the lower front frame narrower than the upper front frame section 42 as shown in FIGS. 2 and 3. The front frame assembly is divided substantially in two portions.

The upper front frame section 42 is provided with a substantially vertically longer elliptic opening 42a in a front view as shown in FIG. 4, a vertically extended portion 42f is provided at both side edges of the opening 42a, a laterally extended portion 42c extended substantially horizontally is provided at an upper edge, and the opening is formed in a vertically longer elliptic shape, when viewed in a front view.

As shown in FIG. 2, the upper front frame section 42 is arranged in an inclined position so that an upper portion is located on the rear side, when viewed in a side view. As shown in FIG. 4, a pair of right and left shock absorber upper end supporting portions 45 is provided in the widest portion of the vertically extended portion 42f of the upper front frame, and a cross member for reinforcement is laid between the pair of right and left shock absorber upper end supporting portions 45.

The right and left shock absorber upper end supporting portions 45 are provided with a pair of supporting portions which are mutually parallel front and rear walls (see FIG. 3), an upper end of the front shock absorber 9 gets in between the pair of supporting portions as shown in FIG. 1, the shock absorber upper end supporting portions are fixed by each bolt 81 piercing in the substantially longitudinal direction of the body (rearward and slightly downward) and each nut 82 fastened to the bolt 81, and the front shock absorber 9 is pivotally attached via stems (coupling stems) of the bolts 81.

As shown in FIGS. 2 and 3, the lower front frame section 43 is provided with upper and lower beam members 43a, 43b vertically at an interval and extended gradually downward in the rearward direction of the body. A front half of each of the upper and lower beam members 43a, 43b is arranged mutually substantially in parallel, while a rear half of the upper beam member 43a is extended backward and steeply downward, compared with the front half, and a rear end of the upper beam member meets the upside of a rear end of the lower beam member 43b at an acute angle in the side view and the rear ends are integrated. Front ends and intermediate parts in a longitudinal direction of the upper and lower beam members 43a, 43b are coupled via front and rear columnar portions 43c, 43d.

In this configuration, the front and rear ends and the intermediate part in the longitudinal direction of the lower front frame section 43 long in the longitudinal direction are integrated, the rigidity is enhanced, front and rear spaces K1, K2 laterally piercing the lower front frame section 43 are formed between the front halves and the rear halves of the upper and lower beam members 43a, 43b, and the lower part of the front frame assembly 41 is lightened.

The upper and lower beam members 43a, 43b are extended in the longitudinal direction in a flat shape laterally wider than vertical thickness. The front and rear columnar portions 43c, 43d are vertically extended in a flat shape laterally wider than longitudinal thickness. The concentration of stress in parts in which the front and rear columnar portions 43c, 43d and the upper and lower beam members 43a, 43b are connected is inhibited by increasing the longitudinal thickness on the tip sides of upper and lower ends of the front and rear columnar portions 43c, 43d.

The lateral width of the lower front frame section 43 is provided to be wider on the rear side. A pair of right and left lower main frame sections 62 is coupled to the rear end of the lower beam member 43b. A pair of right and left gusset pipes 44 is laid between the rears of the upper and lower front frame sections 42, 43.

A front pedestal 49a protruded upwardly is integrated with an upper portion of a front end of the upper beam member 43a and a lower end of the upper front frame section 42 is welded onto the front pedestal 49a. A rear pedestal 49b protruded upwardly is formed on the upside of the intermediate portion in the longitudinal direction of the upper beam member 43a and lower ends of the right and left gusset pipes 44 are welded onto the rear pedestal 49b.

The right and left gusset pipes 44 are an aluminum pipe having an elliptic section, are arranged in an inclined condition so that each upper portion is located on the front side in the side view, are inclined so that each upper portions is directed laterally outside in a front view, and are arranged substantially in a V-type different in width in upper and lower positions.

These right and left gusset pipes 44 are laid between right and left downward extended portions 42d extended downward from the shock absorber upper end supporting portions 45 and both sides of the rear pedestal 49b of the lower front frame section 43. The lateral width of the front of the body frame 4 is extended on the upper side (see FIG. 4), is the maximum in the vicinity of the right and left shock absorber upper end supporting portions 45, and is slightly narrowed on the upper side.

The gusset pipe 44, the upper front frame section 42 and a front half of the upper beam member 43a form a substantial equilateral triangle, when viewed in a side view, and upper space K3 laterally piercing the front frame assembly 41 is formed inside the substantial equilateral triangle. Accordingly, the rigidity of an upper portion of the front frame assembly 41 is enhanced and the front frame assembly is lightened.

As the upper front frame section 42 and the front columnar portion 43c range with them substantially doglegged in the side view and the gusset pipe 44 and the rear columnar portion 43d range linearly in the side view, a portion in which the front vertically longer of the front frame assembly 41 and the lower part (the lower front frame section 43) longer in the longitudinal direction of the front frame assembly 41 cross is solid. As the upper front frame section 42 and the front columnar portion 43c range with them substantially doglegged in the side view, the whole length in the longitudinal direction of the body on the lower side of the body frame 4 is reduced.

A pair of right and left front engine supporting portions 49c in a trapezoidal shape in the side view and protruded diagonally upward and backward is integrated with the upside of the rear end of the upper beam member 43a and a pair of right and left gusset pipes 43f is laid between the front engine supporting portion 49c and the lower main frame 62. Portions in which the lower main frame sections 62 are coupled to the right and left gusset pipes 43f are reinforced by a cross member 43e (see FIG. 3) extended in the direction of vehicle width and an engine supporting bracket 63 protruded upward is provided in the reinforced part.

Bases of a pair of right and left front engine supporting plates 49d (see FIG. 1) are connected to both right and left sides of the front engine supporting portion 49c by bolts and ends of the front engine supporting plates 49d are connected to the upside of a front end of the crankcase 16 of the engine 15 by bolts. That is, the upper front end of the crankcase 16 is supported by the front engine-supporting portions 49c of the lower front frame section 43, via the right and left front engine supporting plates.

The downside of the front end of the crankcase 16 of the engine 15 in addition to the upside of the front end of the crankcase 16 is supported by the fronts of the pair of right and left lower main frame sections 62 via the engine supporting bracket 63, the rear of the cylinder head 17 is supported by an upper cross member 53 laid between upper portions of right and left center frame sections 52 via a rear engine supporting plate 52d (see FIG. 1) configuring a rear engine supporting part, and a rear end of the crankcase 16 is supported by the swing arm pivot part 55 in lower parts of the right and left center frame sections 52 via the pivot 55a (see FIG. 1).

The pair of right and left upper main frame sections 61 are extended in the longitudinal direction between both sides of an upper end at which the front frame assembly 41 is the widest of the front frame assembly 41 (rear ends 42b of the upper front frame section 42) and both sides of an upper end 51b of the center frame assembly 51 (upper ends of the right and left center frame sections 52) as shown in FIGS. 2 and 3, a front end 61a is welded to the rear end 42b of the upper front frame section 42, and a rear end 61b is welded to the front end 52b of each of the right and left center frame sections 52.

As for width between the pair of upper main frame sections 61, width between the front ends 61a in a position of the fuel tank 25 is the widest (see FIG. 3), width between the pair of upper main frame sections is gradually narrower toward the rear ends 61b in the rear of the body, and the pair of upper main frame sections are substantially parallel at the rear ends 61b.

A lower half of the fuel tank 25 is housed in space between the pair of right and left upper main frame sections 61 the width between which is the widest as shown in FIG. 1 and an upper half of the fuel tank is protruded on the upsides of the pair of right and left upper main frame sections 61 in the side view. The fuel tank 25 is located inside the pair of right and left upper main frame sections 61, when viewed in a top view, and substantially in the center in the direction of vehicle width.

A support 61c is provided to an upper end substantially in the center of each of the pair of upper main frame sections 61 and the fuel tank 25 is supported by setting a fixing member 25c protruded from both sides of the fuel tank 25 on the support 61c and connecting the fixing member and the support by a bolt. In FIG. 1, a reference numeral 25a denotes a filler cap mounted on a filler opening at an upper end of the rear of the fuel tank 25 and 25b denotes a pump holder mounted on an opening at an upper end of the front of the fuel tank 25 for supporting a fuel pump in the fuel tank 25.

The radiator 26 is flat in the lateral direction, is located not upright but in slightly forward inclined posture, and is arranged below the fuel tank 25 in the side view. An upper end 26d of the radiator 26 is supported by an upper portion of the upper front frame section 42, its lower end 26e is supported by the center of the upper beam member 43a, and the radiator is arranged substantially in the center in the direction of vehicle width in the top view. A radiator grille 26b is made of resin, is arranged in forward inclined posture inclined a little more than the radiator 26, and is supported by the front frame assembly 41 by laying between the pair of right and left gusset pipes 44.

The pair of right and left lower main frame sections 62 are extended in the longitudinal direction between both sides of the rear end of the lower beam member 43b narrow in width of a lower part of the front frame assembly 41 (both sides of a rear end of the lower front frame section 43) and both sides of a lower end of the center frame assembly 51 (lower ends of the right and left center frame sections 52), each front end of the lower main frame sections is welded to the lower beam member 43b, and each rear end of the lower main frame sections is welded to the right and left center frame sections 52. As for width between the pair of lower main frame sections 62, width between the front ends 62a (see FIG. 3) coupled to the rear end of the lower beam member 43b is the narrowest, width between the lower main frame sections is gradually wider toward the rear of the body, and rear ends 62b are substantially parallel.

The center frame assembly 51 is provided with the pair of right and left center frame sections 52 and upper and lower cross members 53, 54 that couple these as shown in FIGS. 2 and 5. The right and left center frame sections 52 are vertically extended in locations close to the rear of an intermediate part in the longitudinal direction of the body and are symmetrically provided. The rear ends 61b of the pair of right and left upper main frame sections 61 are welded to front sides of the upper ends of the right and left center frame sections 52.

A member support 58 overhanged rearwardly is integrated with the rear sides of the upper ends of the right and left center frame sections 52 and ends of the upper cross member 53 are welded to insides of the right and left member supports 58. The shock absorber upper end supporting portion 56 protruded backward is integrated with the rear side of an intermediate part in the lateral direction of the upper cross member 53.

The lower end of each of the right and left center frame sections 52 is curved and extended forward and the rear end 62b of each of the pair of right and left lower main frame sections 62 is welded to the front end of each center frame section. Ends of the lower cross member 54 (see FIG. 5) are welded to insides in the lateral direction of the lower ends of the right and left center frame sections 52. The link mechanism supporting portion 57 protruded backward is integrated with the rear side of an intermediate portion in the lateral direction of the lower cross member 54.

A step supporting portion 52a for supporting the step 35 is provided outside in the lateral direction of the lower ends of the right and left center frame sections 52 and a seat frame supporting portion (not shown) for supporting the front end of the seat frame 4a is provided on the rear sides of the upper portions of the right and left center frame sections 52.

The swing arm pivot part 55 is provided to the lower part of each of the right and left center frame sections 52 and a front end of the swing arm 12 is vertically rockably supported by the swing arm pivot part 55 via the pivot 55a (see FIG. 1) along the lateral direction. The center frame assembly 51 is extended upward with the lateral width substantially equal and is formed so that the lateral width on the upside is slightly narrower.

The pair of right and left lower main frame sections 62 are inclined so that the rear sides are mutually apart in the top view and are provided substantially horizontally in the side view. As for the pair of right and left upper main frame sections 61, width between the front sides is the widest in the top view, the width is gradually narrower toward the rear sides, the upper main frame sections are mutually extended substantially in parallel at the rear ends, and the upper main frame sections are inclined downward toward the rear as a whole in the side view.

The upper and lower front frame sections 42, 43 are respectively an integrated casting made of aluminum, and the right and left center frame sections 52 and the upper and lower cross members 53, 54 are respectively an integrated forging made of aluminum. The upper and lower front frame sections 42, 43 may be also respectively an integrated forging made of aluminum, and the right and left center frame sections 52 and the upper and lower cross members 53, 54 may be also respectively a casting made of aluminum.

All the upper and lower front frame sections 42, 43, the right and left center frame sections 52 and the upper and lower cross members 53, 54 may be also respectively an integrated casting or forging made of aluminum. The frame sections 61, 62 and the gusset pipes 44, 43f are respectively an integrated part acquired by bending extruded aluminum. A portion of the frame sections 61, 62 or the entire frame sections 61, 62 and the gusset pipes 43, 43f may be also respectively an integrated casting or forging made of aluminum.

Figure 6:
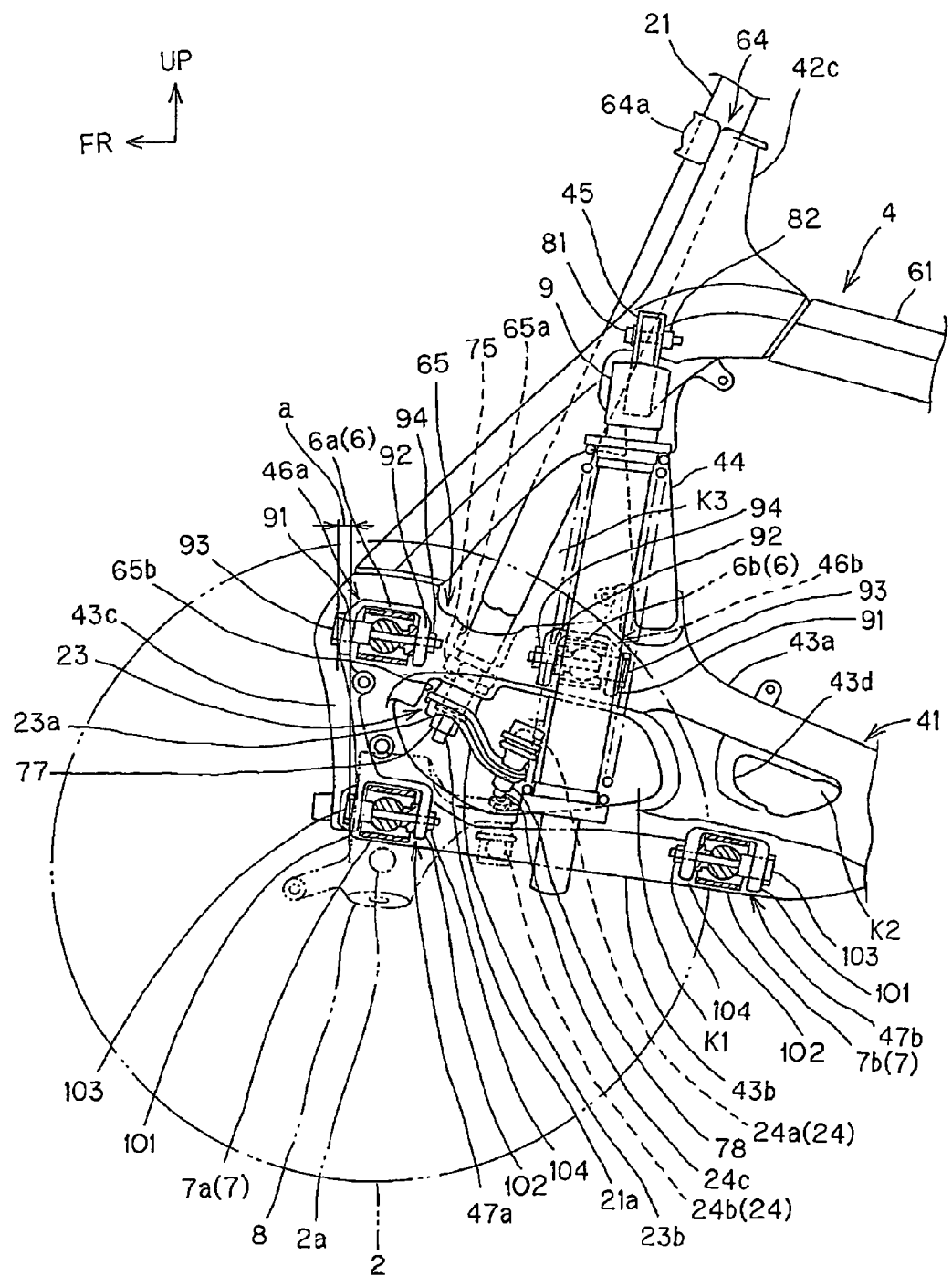
FIG. 6 is a front side view showing a front suspension of the saddle-type vehicle viewed from a front side.
Figure 7:
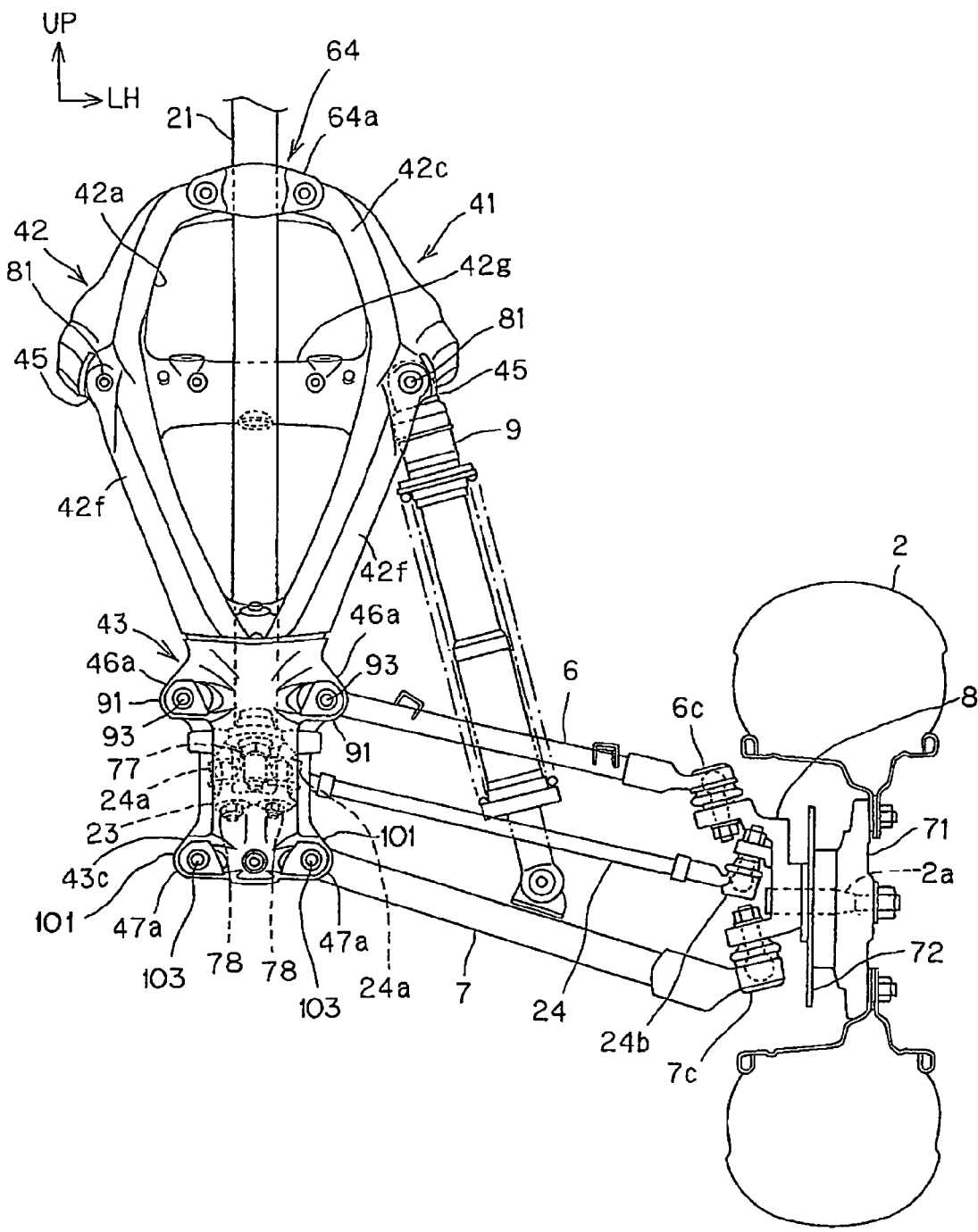
FIG. 7 is a side view of the front suspension shown in FIG. 6.
Figure 8:
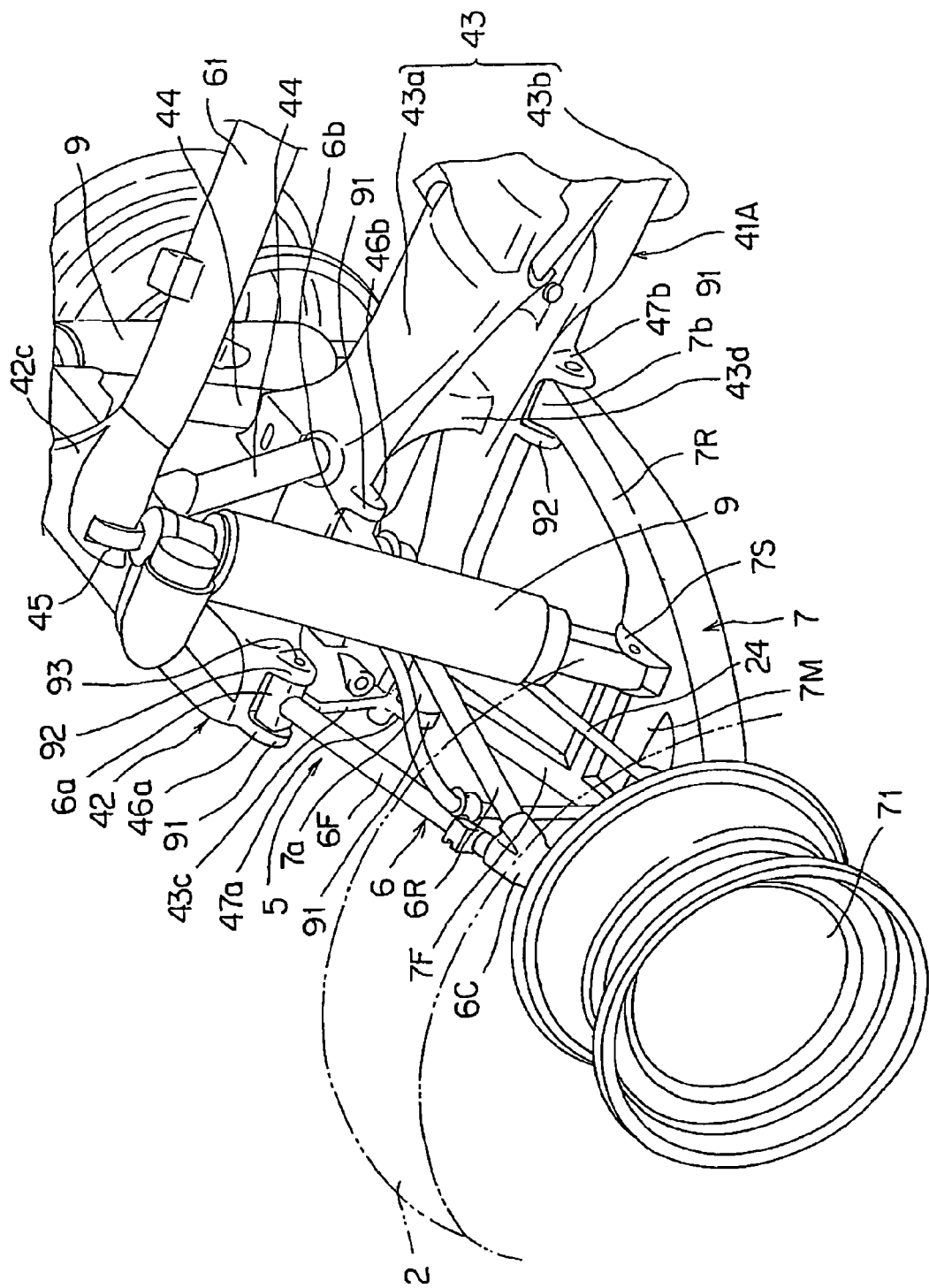
FIG. 8 is a perspective view showing the left side of the front suspension viewed from the rear diagonal upside position.

FIG. 6 is a side view showing the front of the body frame 4 together with its peripheral configuration (the front suspension 5 and others) and FIG. 7 is a front view showing the body. FIG. 8 is a perspective view showing a state in which the front shock absorber 9 and the lower arm 7 are attached.

A laterally extended portion 42c substantially horizontally extended is formed at an upper edge of the upper front frame section 42 as shown in FIGS. 6 and 7. A concave portion 42e (see FIG. 4) in the shape of a circular arc is formed in the center in a direction of the width of the laterally extended portion 42c, a half body 64a divided in the longitudinal direction is fitted into the concave portion 42e, and an upper portion of the steering shaft 21 is pivotally supported by a cylindrical inside face formed inside the half body 64a divided in the longitudinal direction via a cylindrical collar (not shown). That is, an upper steering supporting portion 64 that pivotally supports the upper portion of the steering shaft 21 is formed in the laterally extended portion 42c.

A lower steering supporting portion 65 that pivotally supports the lower end of the steering shaft 21 is provided to a front half of the upper beam member 43a of the front frame assembly 41 as shown in FIG. 6. The lower steering supporting portion 65 is provided with a shaft inserting hole 65a that vertically pierces the upper beam member 43a and a bearing 75 is held in the shaft inserting hole 65a.

The steering shaft 21 is inserted into the shaft inserting hole 65a downward from the upside and the shaft inserting hole pivotally supports the lower end of the steering shaft 21 via the bearing 75. That is, the lower steering supporting portion 65 also functions as a bearing holder for holding the bearing 75. An oil seal (not shown) is arranged on the upside and on the downside of the bearing 75 in the shaft inserting hole 65a of the lower steering supporting portion 65.

The lower end 21a of the steering shaft 21 is formed to have a smaller diameter than that of the upside of the lower end 21a, the small-diameter lower end 21a pierces the bearing 75 and is protruded below (in the space K1) the lower steering supporting portion (the bearing holder) 65, and the center arm 23 of the steering mechanism (the steering system) is attached to the lower end as shown in FIG. 6.

In other words, the space K1 is utilized for space for arranging the steering mechanism (the steering system). As shown in FIG. 6, a handlebar stopper 65b protruded under the upper beam member 43a and touched to the center arm 23 when the steering shaft 21 is turned for regulating a maximum turning angle of the steering shaft 21 (a maximum turning angle of the steering handlebar 22).

The center arm 23 is provided with an arm portion 23b curved downward from a base 23a fixed to the lower end 21a of the steering shaft 21 by a nut 77. The pair of right and left tie rods 24 are attached to the other end of the arm portion 23b with each ball end 24a directed upward and a nut fitting 24c that connects with the ball end 24a is attached with it directed downward (see FIGS. 6 and 7). The ball end 24b on the side of the knuckle 8 of the tie rod 24 is attached to the knuckle 8 with the ball end 24b directed downward as shown in FIG. 7.

Next, the structure of the front suspension 5 is described.

The structure of the front suspension 5 is symmetrical in the lateral direction of the body and each structure is the same. In the following description, only the left side of the body is described and the description of the suspension on the right side is omitted.

As shown in FIG. 6, front and rear upper arm supporting members 46a, 46b overhanged outside in the lateral direction are integrated with both sides of the front end of the upper beam member 43a and both sides of the intermediate part in the longitudinal direction of the upper beam member. The upper arm supporting members 46a, 46b are provided with a pair of supports 91, 92 which are front and rear walls mutually parallel, cylindrical coupling parts 6a and 6b of the upper arm 6 get in between the pair of supports 91, 92, and are fixed by each bolt 93 and each nut 94 fastened to the bolt 93, and the upper arm 6 is rockably coupled via a stem (a coupling stem) of each bolt 93.

Front and rear lower arm supporting portions 47a, 47b respectively overhanged outside in the lateral direction are integrated with both sides of the front end and both sides of the rear of the lower beam member 43b. The lower arm supporting portions 47a, 47b are provided with a pair of supports 101, 102 which are front and rear walls mutually parallel, cylindrical coupling portions 7a and 7b at the base of the lower arm 7 get in between the pair of supports 101, 102 and are fixed by each bolt 103 and each nut 104 fastened to the bolt 103, and the lower arm 7 is rockably coupled via a stem (a coupling stem) of each bolt 103.

In this case, the axis of each bolt 93 fastened to the pair of front and rear upper arm supporting members 46a, 46b is coaxially arranged along the inclination of the front half of the upper beam member 43a and the axis of each bolt 103 fastened to the pair of front and rear lower arm supporting portions 47a, 47b is coaxially arranged along the downward inclination toward the rear of the lower beam member 43b parallel to the front half of the upper beam member 43a. Therefore, the upper arm 6 and the lower arm 7 are rockably supported by the body frame 4 with their bases parallel.

The upper arm 6 the base of which is supported by the upper arm supporting members 46a, 46b and the lower arm 7 the base of which is supported by the lower arm supporting portions 47a, 47b are extended outside in the direction of vehicle width as shown in FIGS. 7 and 8 and each end is coupled to an upper portion and a lower part of the knuckle 8 via each of ball joints 6c, 7c (see FIG. 7). A hub 71 is rotatably coupled outside the knuckle 8 (outside the body) and the front wheel 2 is fastened to each hub 71 by a bolt. A brake disc 72 for braking the front wheel used (FIG. 7).

Next, the arrangement of the front suspension 5 is described.

As the arrangement is also symmetrical in the lateral direction of the body, only the left side of the body is described and the description of the right side is omitted.

As shown in FIG. 6, the upper arm supporting member 46a located on the front side is arranged at the front end (in the forefront of the body) of the upper beam member 43a. The upper arm supporting member 46b on the rear side is located at the back of the steering shaft 21, and the steering shaft 21 is put between the upper arm supporting member 46a on the front side and the upper arm supporting member 46b on the rear side in the longitudinal direction.

Further, the lower arm supporting portion 47a, on the front side, is arranged at a front end of the lower beam member 43b and is located substantially below the front upper arm supporting member 46a (as shown in detail in FIG. 6, the lower arm supporting portion 47a is offset forwardly from the upper arm supporting member 46a on the rear side by a dimension 'a'). The front lower arm supporting portion 47a is arranged to be substantially aligned with an extended line of the steering shaft 21, as seen in side view and as shown in FIG. 6. The front end of the lower beam member 43b can be located in the substantially same position as the front end of the upper beam member 43a, in the longitudinal direction of the body, by such arrangement.

Also, as shown in FIG. 6 and in FIG. 8, the lower arm supporting portion 47b, on the rear side, is arranged below and spaced rearwardly away from the upper arm supporting member 46b on the rear side. In detail, the lower arm supporting portion 47b is located at an intersection of the rear columnar portion 43d and the lower beam member 43b, and by the above-described arrangement, structural stress from supporting the lower arm 7 is distributed to the upper front frame section 42 via the columnar portions 43c, 43d.

As shown in FIG. 8, the upper arm 6 attached to the upper arm supporting members 46a, 46b is configured by a front arm portion 6F and a rear arm portion 6R respectively formed in the shape of a shaft. The front arm portion 6F and the rear arm portion 6R are attached to the knuckle 8 in a triangle having an apex on the side of the front wheel 2.

Further, the lower arm 7 attached to the lower arm supporting portions 47a, 47b is provided with a front arm portion 7F and a rear arm portion 7R. Similar to the upper arm 6, and the front arm portion 7F and the rear arm portion 7R of the lower arm 7, are attached to the knuckle 8 in a triangle having an apex on the side of the front wheel 2. The lower arm 7 is formed by integrating the front arm portion 7F and the rear arm portion 7R by casting and is a relatively heavy member as a portion configuring the front suspension 5. The rear arm portion 7R is formed in a curved shape gently swollen in the rearward direction of the body as shown in FIG. 8.

In the related art, the lower arm 7 is located on the front side of the upper arm 6 in the longitudinal direction of the body, the upper arm 6 and the lower arm 7 are arranged side by side on the extended line of the steering shaft 21, and the upper arm supporting members 46a, 46b and the lower arm supporting portions 47a, 47b are also arranged in accordance with the upper arm and the lower arm.

In the front suspension 5 of the illustrative embodiment according to the present invention, in a state in which the upper arm 6 and the lower arm 7 are attached to the upper arm supporting members 46a, 46b and the lower arm supporting portions 47a, 47b, the lower arm 7 is arranged off the upper arm 6 on the central side of the body, compared with the conventional type structure. When viewed in a top view, the triangular shape of the lower arm 7 is larger on the rear side of the body than the triangular shape of the upper arm 6.

A reinforcing member 7M connecting the front arm portion 7F and the rear arm portion 7R in the longitudinal direction of the body is integrated with the lower arm 7. A shock absorber lower end supporting portion 7S to which a lower end of the front shock absorber 9 is attached is provided to a top face of the rear of the reinforcing member 7M. The shock absorber lower end supporting portion 7S is located outside the rear side of the triangular shape of the upper arm 6 in the top view in a state in which the upper arm 6 and the lower arm 7 are attached.

The front shock absorber 9 is attached on the rear side (on the side of a rear end) of the upper arm 6 in a state in which the front shock absorber is attached to the shock absorber upper end supporting portion 45 and the shock absorber lower end supporting portion 7S as shown in FIG. 8.

In detail, the front shock absorber 9 is extended downward from the shock absorber upper end supporting portion 45 through the back of the rear arm portion 6R and is extended to the shock absorber lower end supporting portion 7S. The front shock absorber 9 is inclined diagonally downward in the forward direction of the body from the body frame 4 when viewed in a side view as shown in FIG. 6, and is inclined diagonally downward outside in the direction of vehicle width from the body frame 4, when viewed in a front view, as shown in FIG. 7.

The front shock absorber 9 is arranged on the rear side of the tie rod 24, as shown in FIGS. 6 and 8. In detail, the ball end 24a of the tie rod 24 is arranged off the steering shaft 21 on the rear side of the body because of the arm portion 23b. However, the ball end is located on the front side of the front shock absorber 9. The ball end 24b on the side of the knuckle 8 is also located substantially on the downside of the ball end 24a in the side view as shown in FIG. 6 and is located on the front side of the front shock absorber 9.

Further, the front arm portion 6F of each of the pair of right and left upper arms 6 is extended toward the knuckle 8 located in the lateral direction as shown in FIGS. 6 and 8. The rear arm portion 6R is extended toward the knuckle 8 located diagonally in front as shown in FIGS. 6 and 8. The front shock absorber 9 is vertically extended in a position overlapped with the upper arm supporting member 46b on the rear side in the side view as shown in FIG. 6 and is attached to the lower arm 7 between the front and rear arm portion supporting portions 47a, 47b of the lower arm 7.

Figure 9:
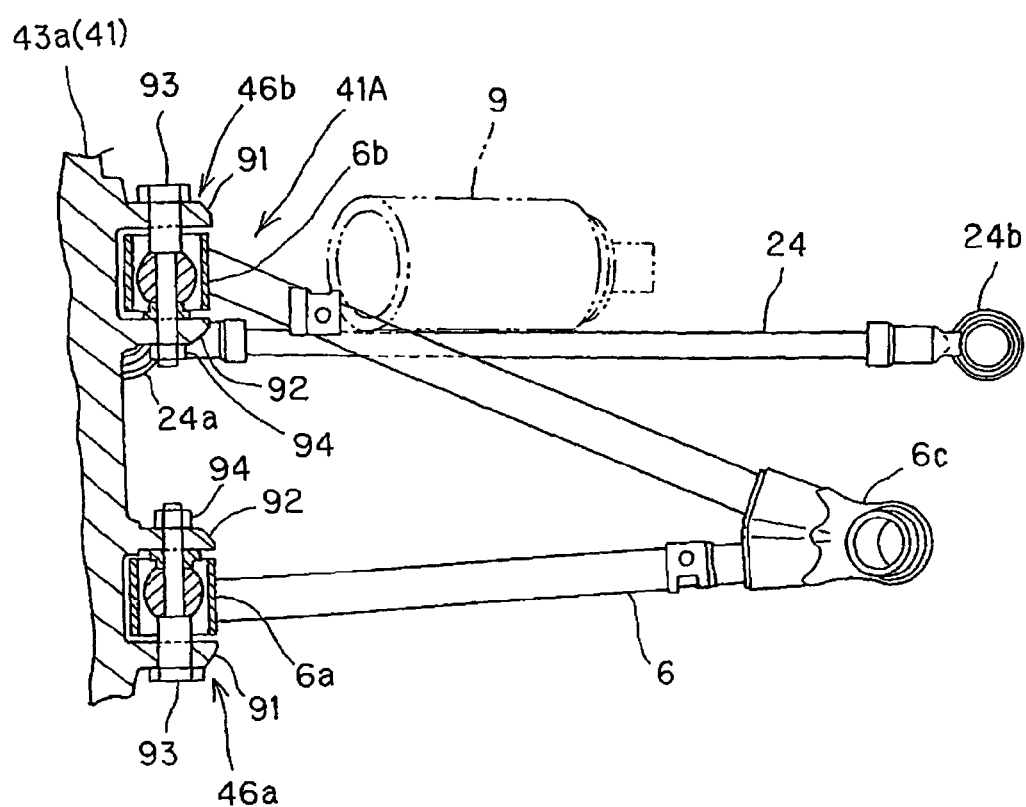
FIG. 9 shows an upper arm together with its peripheral configuration respectively viewed from the upside.

FIG. 9 shows the upper arm 6 together with its peripheral configuration respectively viewed in a top view.

Figure 10B:
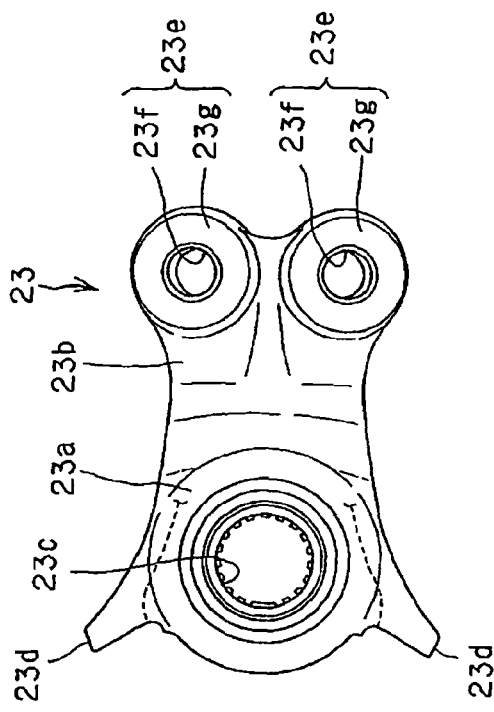
FIG. 10B is a front view showing the center arm.
Figure 10C:
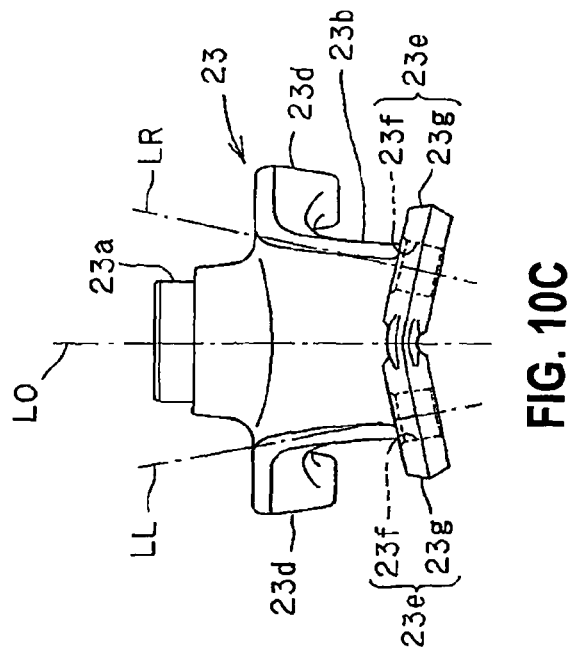
FIG. 10C is a back view showing the center arm.
Figure 10A:
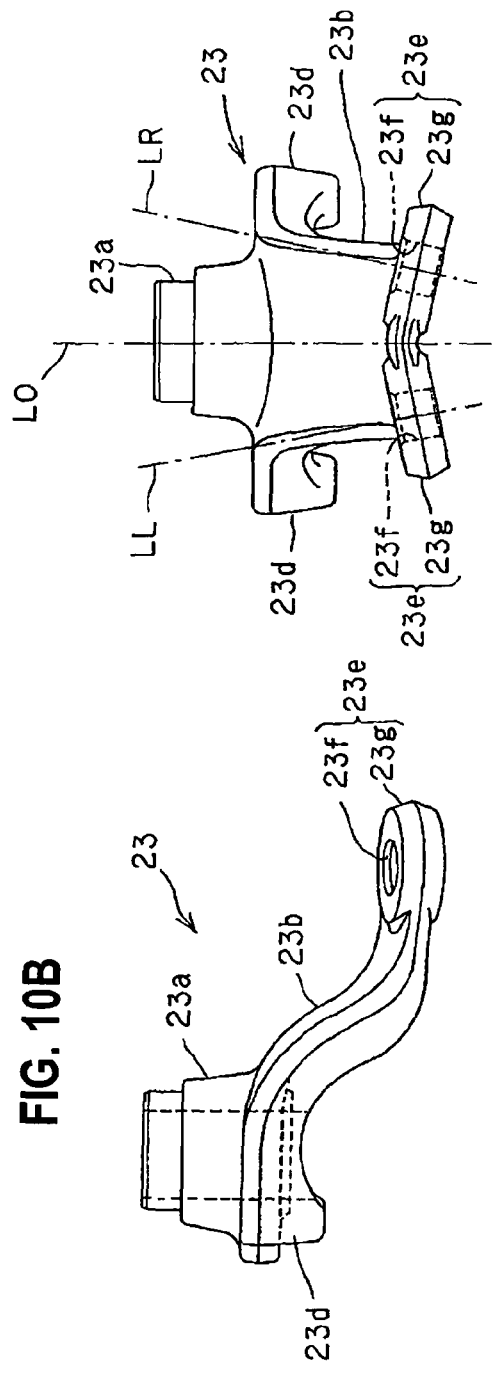
FIG. 10A is a side view showing a center arm.

FIG. 10A is a side view showing the center arm 23, FIG. 10B is a top view showing the center arm 23, and FIG. 10C is a rear view of the center arm.

The center arm 23 is a cast part integrally provided with a base 23a into which the lower end 21a of the steering shaft 21 is inserted and an arm portion 23b extended from the base 23a. The base 23a is formed in the shape of a cylinder having a through hole vertically piercing. Grooves 23c fitted to plural convex portions (not shown) formed at the lower end of the steering shaft 21 are provided inside the through hole of the base 23a, and the steering shaft 21 and the center arm 23 are integrally pivotally fitted by the fitting of these. A pair of right and left projections 23d protruded sideways is provided in the lateral direction of the base 23a, and the maximum turning angle of the steering shaft 21 (the maximum turning angle of the steering handlebar 22) is regulated by touching each projection 23d of the center arm 23 to the handlebar stopper 65b provided to the body frame 4 when the steering shaft 21 is turned.

The arm portion 23b is vertically thinner than the vertical thickness of the base, is wider in a horizontal direction than its vertical thickness, and is flat, and is curved downward from the base 23a. A pair of right and left ball end fixing portions 23e to which the ball ends 24a (see FIG. 7) provided on the sides of the bases of the pair of right and left tie rods 24 are fixed is formed at an end of the arm portion 23b.

Each of the pair of right and left ball end fixing portions 23e is provided with a tapped hole 23f that pierces substantially vertically and each pedestal 23g forming a circumferential member of each tapped hole 23f. As shown in FIG. 10C, each of central axes LL, LR of each tapped hole 23f is set to an inclined axis inclined at the same angle to be symmetrical and be tapered based upon a central axis L0 (coincident with the axis of the steering shaft 21) of the through hole in a back view, and each of the central axes LL, LR is apart in the lateral direction from the central axis L0 toward the upside. Each of the central axes LL, LR is vertically extended substantially in parallel with the central axis L0, when viewed in a side view, of the center arm 23.

Each pedestal 23g to which the tapped hole 23f is provided forms surfaces to which the ball end 24a is fitted, upper and lower surfaces of the pedestal are perpendicular to the central axes LL, LR of the tapped hole 23f that pierces each pedestal 23g, the lower surface are mutually directed substantially inside in the back view, and the upper surfaces are mutually directed substantially outside.

The inclination and a position of the central axes LL, LR are univocally determined when a layout (the length, a position, a shape and others) of the tie rod 24 is determined. As the arm portion 23b of the center arm 23 is curved downward from the base 23a, the pair of right and left ball end fixing portions 23e provided to the end of the arm portion 23b can be located on the downside on which the central axes LL, LR mutually approach as shown in FIG. 10C.

Therefore, the tapped holes 23f formed in the right and left ball end fixing portions 23e can be brought close, compared with a case that the right and left ball end fixing portions 23e are provided on the upside on which the central axes LL, LR are apart. That is, the right and left ball end fixing portions 23e are arranged mutually close and the arm portion 23b can be formed to be narrow in width.

When the center arm 23 is attached to the lower end 21a of the steering shaft 21 by a nut 77, the center arm 23 is arranged with the arm portion 23b lower than the base 23a as shown in FIG. 6 because the steering shaft 21 is arranged with the shaft inclined rearwardly.

Therefore, the ball end fixing part 23e formed at the end of the arm portion 23b is arranged in a position on the downside apart from the upper beam member 43a and in a position in front of the front shock absorber 9 in the side view of the body, that is, can be laid out on the front side of the front shock absorber 9 in the space K1.

In the right and left ball end fixing portions 23e of the center arm 23, as shown in FIG. 6, a nut fitting 24c ranging on the downside of the ball end 24a provided on the side of the base of the tie rod 24 is inserted into the tapped hole 23f of each pedestal 23g downward from the upside, is positioned in the pedestal 23g, and the nut fitting is fixed by fastening a nut 78 to the nut fitting 24c protruded on the downside of the pedestal 23g.

That is, the tie rod 24 is fixed to the center arm 23 in posture that the ball end 24a provided to the base is directed upward, the nut fitting 24c connecting with the ball end 24a is directed downward and the nut fitting 24c is inclined inside the body (see FIGS. 6 and 7).

Therefore, as shown in FIG. 6, the ball end 24a attached to the center arm 23 is laid out so that it is housed in space on the front side of the front shock absorber 9 in the space K1 in the side view of the body. Therefore, the tie rod 24 can be laid between the center arm 23 and the knuckle 8 without touching the tie rod to the front shock absorber 9, the upper beam member 43a and the lower beam member 43b of the front frame assembly 41 and others (see FIG. 7).

The ball end 24b on the side of the end of the tie rod 24 is attached to the knuckle 8 with the ball end 24b directed downward as shown in FIG. 7. Depending upon a shape of the knuckle 8, the ball end 24b on the side of the end of the tie rod 24 is not limited to the case that it is directed downward and the ball end 24b may be also attached with the ball end directed upwardly.

As described above, in this embodiment, as the center arm 23 is provided on the downside of the lower steering supporting portion 65 that supports a lower part of the steering shaft 21, the center arm 23 is curved downward and the ball end 24a of the tie rod 24 is fixed to the center arm 23, the ball end fixing part 23e formed at the end of the center arm 23 can be arranged in the position on the downside apart from the upper beam member 43a and in the position in front of the front shock absorber in the side view of the body and the center arm 23 can be laid out efficiently utilizing the space K1 under the lower steering supporting portion 65.

In addition, as the tie rod 24 is attached to the center arm 23 in the posture that the ball end 24a of the tie rod 24 is directed upward, the nut fitting 24c connecting with the ball end 24a is directed downward and the side of the nut fitting 24c is inclined inside the body, the ball end 24a can be appropriately arranged utilizing the space between the center arm 23 and the upper beam member 43a.

The layout of the ball end 24a corresponds to a layout that meets a condition for attaching the ball end 24a which is univocally determined when the layout of the tie rod 24 is determined and the tie rod 24 can be appropriately laid out in the small layout space, meeting such a condition for attaching.

In addition, as the upper portion of the steering shaft 21 is supported by the upper front frame section 42 that supports the upper ends of the pair of right and left front shock absorbers 9 and the lower part of the steering shaft 21 is supported by the lower steering supporting portion (the bearing holder) 65 provided to the upper beam member 42a of the lower front frame section 43 via the bearing 75, the upper and lower parts of the steering shaft 21 can be supported utilizing the existing upper front frame section 42 and the existing upper beam member 43a without supporting the steering shaft 21 by the lower beam member 43b. In this case, as the center arm 23 is arranged between the upper beam member 43a and the lower beam member 43b, the space K1 formed between the upper beam member 43a and the lower beam member 43b can be efficiently utilized for space for arranging the center arm 23.

The present invention has been described based upon one embodiment, however, the above-mentioned embodiment is one example of the present invention and the present invention is not limited to this embodiment.

For example, needless to say, the present invention can be also applied to a vehicle provided with wheels of a number exceeding three or four wheels and a vehicle which is not a saddle-type and various alterations are allowed in a range which does not deviate from the object of the invention.

According to the front wheel suspension structure of the saddle-type vehicle in the embodiment of the present invention, as the front shock absorber 9 is arranged on the rear side in the body of the upper arm 6, a center of gravity of the heavy front shock absorber 9 can be shifted in a central direction of the body and the mass of the whole vehicle can be concentrated on the central side of the body. Hereby, a desirable layout of the body when it is lifted in the air during operation thereof is achieved. As the lower end of the front shock absorber 9 can be attached to the lower arm 7 from the rear side of the upper arm 6, work for mounting is facilitated.

Particularly, as the lower arm 7 is arranged in the central direction off the upper arm 6 and the shock absorber lower end supporting portion 7S is arranged on a top face of the lower arm 7 offset, structure for attaching the lower end of the front shock absorber 9 is also facilitated and the work for mounting can be also more simplified.

As the front shock absorber 9 is arranged on the rear side in the body of the tie rod 24, the mass of the whole vehicle can be similarly concentrated on the central side of the body. Hereby, the layout of the body in the air is facilitated.

Further, as the front arm portion 6F of each of the pair of right and left upper arms 6 is extended in the lateral direction, the rear arm portion 6R is extended diagonally forward, the front shock absorber 9 is extended in the position overlapped with the upper arm supporting member 46b in the side view and is attached to the lower arm 7 between the front and rear arm portion supporting portions 47a, 47b of the lower arm 7, space for arranging the front shock absorber 9 can be secured by extending the rear arm portion 6R of the upper arm 6 diagonally forward, the rear arm portion 7R of the lower arm 7 is arranged on the rear side to enable supporting the lower end of the front shock absorber 9 between the front arm portion 7F and the rear arm portion 7R of the lower arm 7, and the mass of the whole vehicle can be concentrated on the central side of the body.

The center of gravity of the front shock absorber 9 can be shifted in the central direction of the body without making the arrangement of the upper arm 6 and the lower arm 7 intricate and the mass of the whole vehicle can be concentrated on the central side of the body. Hereby, the layout of the body in the air is facilitated.

As the lower arm supporting portion 47a is arranged at the front end of the lower beam member 43b and is located substantially on the downside of the upper arm supporting member 46a, the length in the longitudinal direction of the body on the downside of the body can be reduced by locating the front end of the lower beam member 43b in the same position as the front end of the upper beam member 43a in the longitudinal direction. The mass of the body frame 4 itself can be shifted on the central side of the body.

Further, as only the lower arm supporting portion 47b is shifted on the central side of the body without changing a position of the upper arm supporting member 46b, the upper arm 6 can be made compact and light as in the past.

According to the front wheel suspension structure of the saddle-type vehicle in the embodiment of the invention, as the lower arm 7 is arranged in the central direction of the body off the upper arm 6, a center of gravity of the heavy lower arm can be shifted in the central direction of the body and the mass of the whole vehicle can be concentrated on the central side of the body. Hereby, a desirable layout of the body when lifted in the air during operation thereof is facilitated.

In addition, as the front shock absorber 9 is provided to the rear side of the upper arm 6, the center of gravity of the front shock absorber 9 can be shifted in the central direction of the body and the mass of the whole vehicle can be concentrated on the central side of the body. Hereby, the desirable layout of the body, even when lifted in the air during operation thereof, is facilitated.

Particularly, as the lower arm 7 is arranged in the central direction off the upper arm 6 and the shock absorber lower end supporting portion 7S is arranged on the top face of the lower arm 7 offset, structure for attaching the lower end of the front shock absorber 9 is also facilitated and work for mounting can be also more simplified.

Further, as the front upper arm supporting member 46a of the lower arm 7 is provided on an extended line of the steering shaft 21, the center of gravity of the heavy lower arm 7 can be shifted in the central direction of the body and the mass of the whole vehicle can be concentrated on the central side of the body. Accordingly, the desirable layout of the body is facilitated.

As the front frame 41 is configured by the upper front frame section 42 that supports of the upper end of the front shock absorber 9 and the lower front frame section 43 that supports the front arm portions 6F, 7F and the rear arm portions 6R, 7R, the upper front frame section 42 and the lower front frame section 43 are welded on the front side and the pair of right and left gusset pipes 44 vertically extended is provided between the upper and lower front frame sections 42, 43, the strength of the front frame 41 that functions as a base for mounting the front suspension 5 can be enhanced.

As the lower arm supporting portion 47a is arranged at the front end of the lower beam member 43b and is located substantially on the downside of the upper arm supporting member 46a, the length in the longitudinal direction of the body on the downside of the body can be reduced by locating the front end of the lower beam member 43b in the same position as the front end of the upper beam member 43a in the longitudinal direction. The mass of the body frame 4 itself can be shifted on the central side of the body.

Further, as only the lower arm supporting portion 47b is shifted on the central side of the body without changing a position of the upper arm supporting member 46b, the upper arm 6 can be made compact and light as in the past.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A front wheel suspension structure for a saddle-type vehicle, said suspension structure comprising a double wishbone suspension system comprising:
    a pair of right and left upper arms, and
    a pair of right and left lower arms;
    wherein:
    each of the upper arms and the lower arms comprises a front arm portion and a rear arm portion;
    each of the upper arms and the lower arms is attached to a respective side portion of a vehicle body frame at two points;
    when viewed in a vehicle side view, the rear arm portion of the upper arm is located in front of the rear arm portion of the lower arm; and
    at least one front shock absorber is arranged at a location rearward of at least one of the rear arm portions of the upper arms.

2. A front wheel suspension structure for a saddle-type vehicle according to claim 1, wherein said saddle-type vehicle comprises a tie rod; and wherein the front shock absorber is arranged rearwardly of said tie rod.

3. A front wheel suspension structure for a saddle-type vehicle according to claim 1, wherein:
    the front arm portion of each of the pair of right and left upper arms is extended in a lateral direction of the vehicle body;
    the rear arm portion of each of the pair of right and left upper arms is extended in a diagonally forward direction of the vehicle body; and
    when viewed in a side view, the front shock absorber is extended in a position overlapped with an upper arm supporting member, and is attached to the lower arm between front and rear arm portion supporting portions of the lower arm.

4. A front wheel suspension structure for a saddle-type vehicle according to claim 2, wherein:
    the front arm portion of each of the pair of right and left upper arms is extended in a lateral direction of the vehicle body;
    the rear arm portion of each of the pair of right and left upper arms is extended diagonally forward direction of the vehicle body; and
    when viewed in a side view, the front shock absorber is extended in a position overlapped with an upper arm supporting member, and is attached to the lower arm between front and rear arm portion supporting portions of the lower arm.

5. A front wheel suspension structure for a saddle-type vehicle according to claim 2, wherein said saddle-type vehicle comprises a center arm; and wherein said tie rod is attached to said center arm such that a ball end of the tie rod is directed upwardly, a nut assembly connected with the ball end is directed downwardly and the side of the nut assembly is inclined inside the vehicle body.

6. A front wheel suspension structure for a saddle-type vehicle according to claim 1, wherein said saddle-type vehicle comprises:
a front frame formed by a lower front frame and an upper front frame; said lower front frame including an upper beam member and a lower beam member; and
a pair of right and left front shock absorbers;
wherein:
said upper front frame is configured to support upper ends of each of said right and left front shock absorbers;
said upper beam member of said lower front frame is arranged at a position located below the upper front frame and supports said upper arms;
said lower beam member of said lower front frame supports the lower arms;
said front frame supports a steering shaft;
an upper portion of the steering shaft is supported by the upper front frame; and
the lower portion of the steering shaft is supported by a bearing holder provided on an upper beam member of the lower front frame via a bearing.

7. A front wheel suspension structure for a saddle-type vehicle according to claim 2, wherein said saddle-type vehicle comprises:
a front frame formed by a lower front frame and an upper front frame; said lower front frame including an upper beam member and a lower beam member; and
a pair of right and left front shock absorbers;
wherein:
said upper front frame is configured to support upper ends of each of said right and left front shock absorbers;
said upper beam member of said lower front frame is arranged at a position located below the upper front frame and supports said upper arms;
said lower beam member of said lower front frame supports the lower arms;
said front frame supports a steering shaft;
an upper portion of the steering shaft is supported by the upper front frame; and
the lower portion of the steering shaft is supported by a bearing holder provided on an upper beam member of the lower front frame via a bearing.

8. A front wheel suspension structure for a saddle-type vehicle according to claim 6, wherein said saddle-type vehicle includes a center arm arranged at a lower portion of the bearing holder that holds the bearing which supports the lower portion of the steering shaft;
wherein the center arm is curved downward;
wherein a ball end of the tie rod is fixed to the center arm;
wherein said lower front frame includes upper and lower beam members;
and wherein the center arm is arranged between the upper and the lower beam members of the lower front frame.

9. A front wheel suspension structure for a saddle-type vehicle according to claim 7, wherein said saddle-type vehicle includes a center arm arranged at a lower portion of the bearing holder that holds the bearing which supports the lower portion of the steering shaft;
wherein the center arm is curved downward;
wherein a ball end of the tie rod is fixed to the center arm;
said lower front frame includes upper and lower beam members;
wherein the center arm is arranged between the upper and the lower beam members of the lower front frame.

10. A front wheel suspension structure for a saddle-type vehicle, comprising
a double wishbone suspension system comprising a pair of right and left upper arms and a pair of right and left lower arms;
wherein at least one of said lower arms is offset in a vehicle longitudinal direction in relation to one of said upper arms;
and wherein as viewed in a side view thereof, a front supporting portion of one of the lower arms is aligned with an extended line of a steering shaft.

11. A front wheel suspension structure for a saddle-type vehicle according to claim 10, wherein:
the upper arms and the lower arms are respectively configured by a front arm portion and a rear arm portion, and each of the upper arms and the lower arms is attached to a side of a vehicle body at two points;
when viewed in a side view, the rear arm portions of the upper arms is located in front of the rear arm portions of the lower arms in the vehicle body; and at least one front shock absorber is provided on a rear of one of the rear arm portions of the upper arms.

12. A front wheel suspension structure for a saddle-type vehicle according to claim 10, wherein said saddle-type vehicle further comprises a front frame comprising an upper front frame section that supports an upper end of the front shock absorber; and a lower front frame section that supports the front and rear arm portions of the lower arms; and wherein the upper front frame section and the lower front frame section are welded together at a front side thereof.

13. A front wheel suspension structure for a saddle-type vehicle according to claim 11, wherein said saddle-type vehicle further comprises a front frame comprising an upper front frame section that supports an upper end of the front shock absorber; and a lower front frame section that supports the front and rear arm portions of the lower arms; and wherein the upper front frame section and the lower front frame section are welded together at a front side thereof.

14. A front wheel suspension structure for a saddle-type vehicle according to claim 10, wherein said saddle-type vehicle comprises a tie rod; and wherein the front shock absorber is arranged on a rear of said tie rod.

15. A front wheel suspension structure for a saddle-type vehicle according to claim 10, wherein:
the front arm portion of each of the pair of right and left upper arms is extended in a lateral direction;
the rear arm portion is extended diagonally forward direction; and
when viewed in a side view, said at least one front shock absorber is extended in a position overlapping with an upper arm supporting member, and is attached to the lower arm between front and rear arm portion supporting portions of the lower arm.

16. An all-terrain vehicle comprising:
a vehicle frame;
a double wishbone front suspension system comprising a pair of right and left upper arms, and a pair of right and left lower arms; each of the upper arms and the lower arms being respectively attached to the vehicle frame at two points; each of the upper arms and the lower arms including a front arm portion and a rear arm portion; and
a pair of front shock absorbers arranged at a location rear of the rear arm portions of the upper arms;

wherein when viewed in a side view, the rear arm portions of the upper arms are located in front of the rear arm portions of the lower arms.

17. An all-terrain vehicle according to claim 16, further comprising a tie rod; and wherein said front shock absorbers are arranged on a rear of said tie rod.

18. An all-terrain vehicle according to claim 16, wherein:

the front arm portion of each of the pair of right and left upper arms is extended in a lateral direction of the vehicle body;

the rear arm portion of each of the pair of right and left upper arms is extended diagonally forward direction of the vehicle body; and when viewed in a side view, each of the front shock absorbers is extended in a position overlapping with an upper arm supporting member, and is attached to the lower arm between front and rear arm portion supporting portions of the lower arm.

\* \* \* \* \*